(12) United States Patent
Diekmann et al.

(10) Patent No.: US 8,530,789 B2
(45) Date of Patent: Sep. 10, 2013

(54) POWER MODULE CARTRIDGE

(75) Inventors: Craig L. Diekmann, Mentor, OH (US);
David W. Perrin, Wadsworth, OH (US);
Lawrence A. Boehnlein, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2193 days.

(21) Appl. No.: 11/010,850

(22) Filed: Dec. 13, 2004

(65) Prior Publication Data
US 2006/0124620 A1 Jun. 15, 2006

(51) Int. Cl.
*B23K 9/10* (2006.01)

(52) U.S. Cl.
USPC ........................................ 219/130.1; 361/695

(58) Field of Classification Search
USPC .............. 219/130.1, 136; 361/728, 729, 730, 361/731
See application file for complete search history.

(56) References Cited

U.S. PATENT DOCUMENTS

| | | | |
|---|---|---|---|
| 4,296,454 A | | 10/1981 | Wong |
| 4,706,808 A | * | 11/1987 | Guetersloh .................... 206/305 |
| 4,827,237 A | | 5/1989 | Blackburn |
| 4,926,291 A | | 5/1990 | Sarraf |
| 4,985,806 A | * | 1/1991 | Mazzullo et al. .............. 361/728 |
| 5,747,773 A | | 5/1998 | Griffin et al. |
| 5,831,240 A | | 11/1998 | Katooka et al. |
| 5,966,010 A | * | 10/1999 | Loy et al. ....................... 361/659 |
| 6,147,581 A | * | 11/2000 | Rancourt et al. ................ 336/65 |
| 6,194,684 B1 | | 2/2001 | Clark et al. |
| 6,665,183 B1 | | 12/2003 | Shikata et al. |

FOREIGN PATENT DOCUMENTS

| | | |
|---|---|---|
| EP | 05024782 | 3/2006 |
| JP | 11 346069 A | 12/1999 |

OTHER PUBLICATIONS

Office Action from Canadian Intellectual Property Office dated Oct. 13, 2006.

* cited by examiner

*Primary Examiner* — Brian Jennison
(74) *Attorney, Agent, or Firm* — Hahn Loeser & Parks LLP

(57) ABSTRACT

A power module cartridge for a welder includes a chassis tray that is dimensioned to fit inside an external case of the welder. The chassis tray includes a fan receptacle, a capacitor receptacle, a rectifier mounting slot and a transformer receptacle. A fan fits into the fan receptacle; a capacitor fits into the capacitor receptacle; a rectifier plate fits into the rectifier mounting slot; and a transformer fits into the transformer receptacle. The chassis tray can also include a clip for receiving a printed circuit board ("PCB"). The PCB can be electrically connected to the aforementioned components. A second chassis tray can fit on the top of each of the components such that the components are sandwiched between the first and second chassis trays. A method of manufacturing a welder is also disclosed.

39 Claims, 12 Drawing Sheets

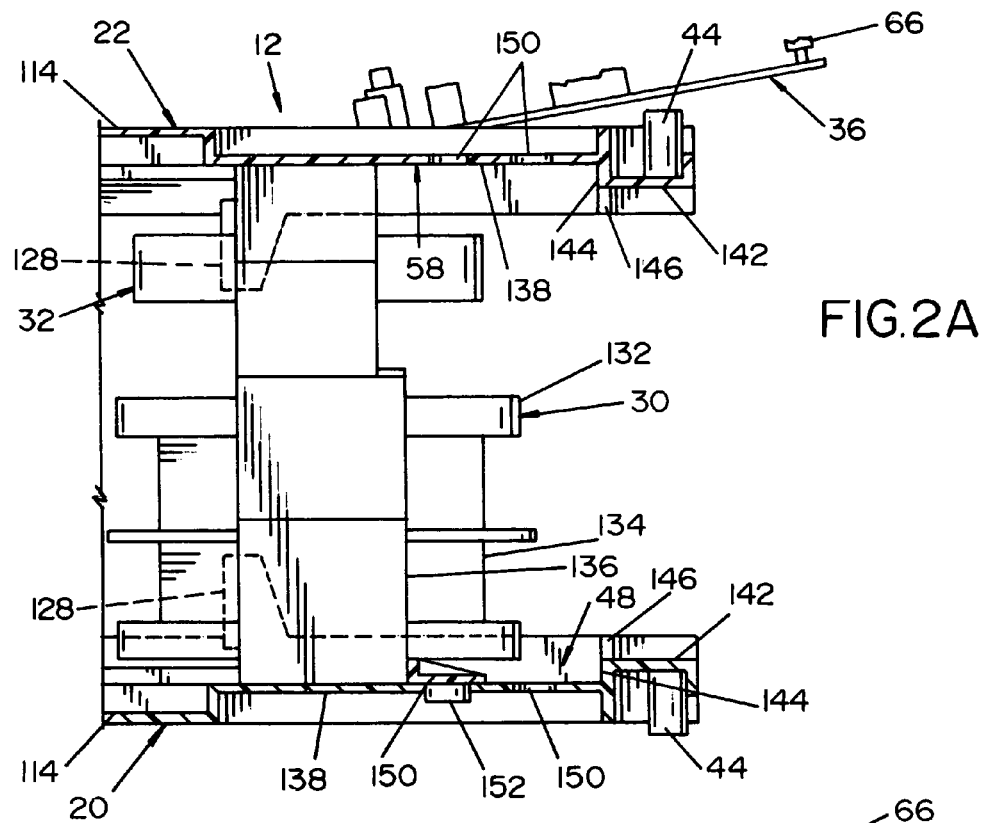
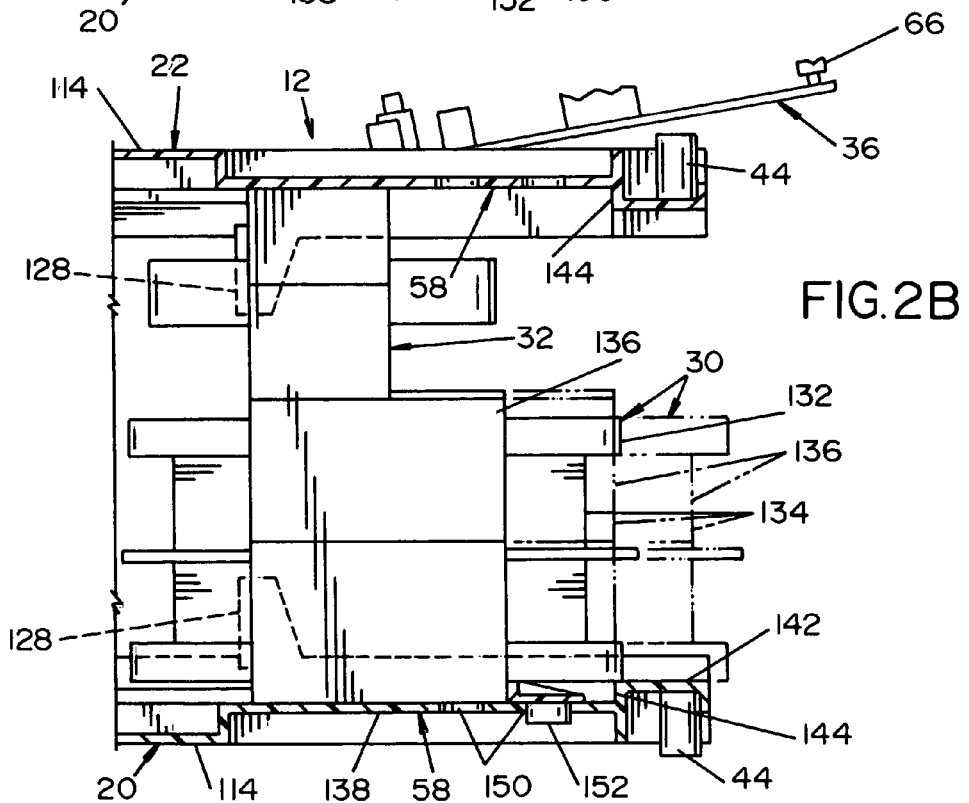

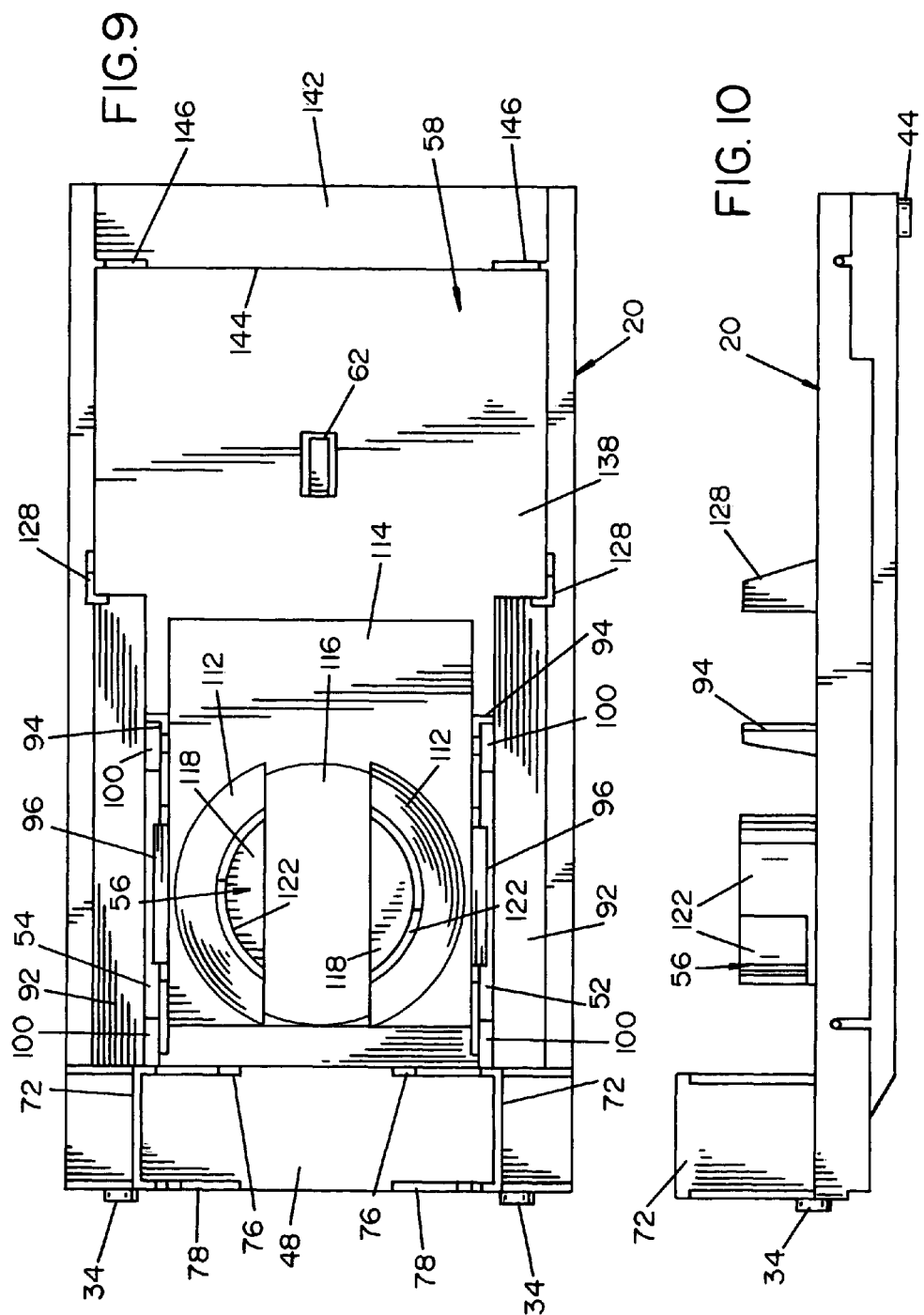

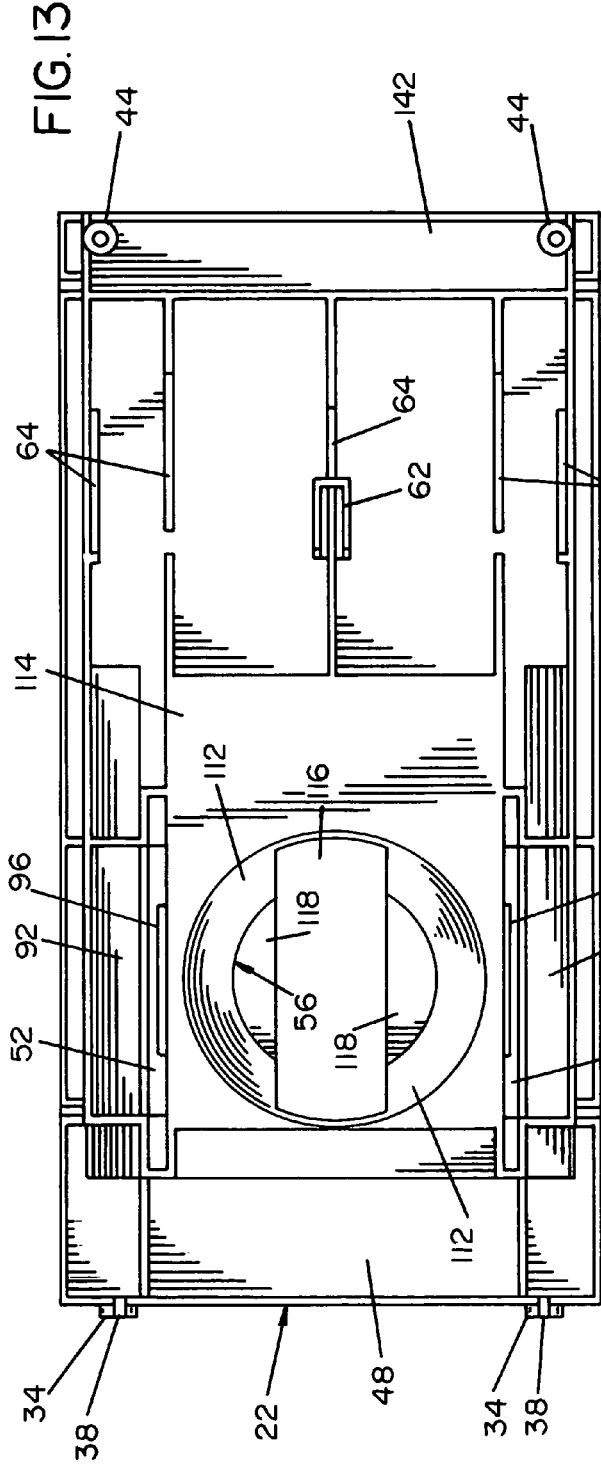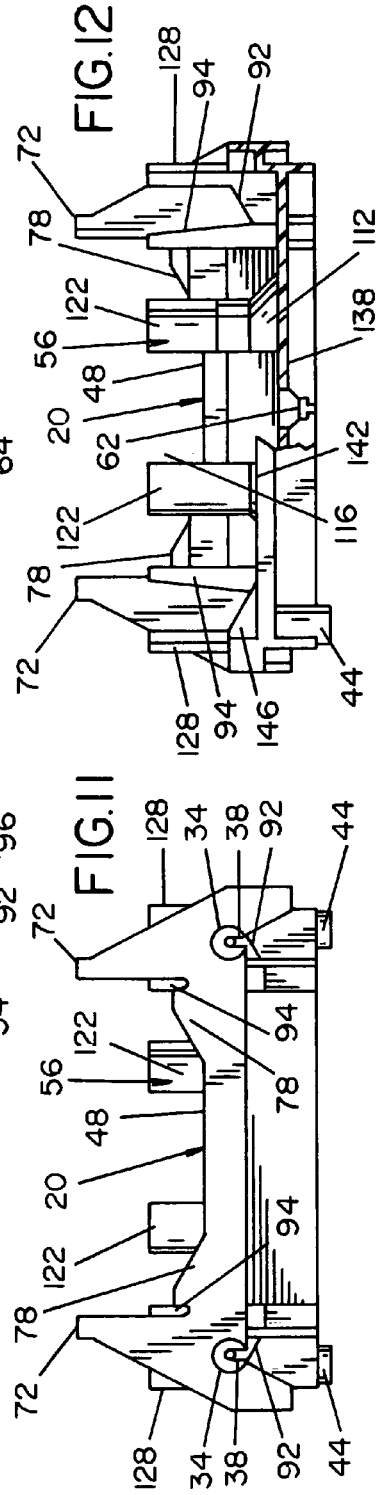

POWER MODULE CARTRIDGE

BACKGROUND OF THE INVENTION

A known wire feeder welder consists of a number of individual components and subassemblies that are mounted separately inside the welder. These individual components and subassemblies perform in conjunction with each other to produce an output required for welding. The main power supply components for the welder include a transformer, a choke, a capacitor, a rectifier, and a control printed circuit board. Wiring connects the components to one another and the fan can cool the components.

In addition to producing the output required for welding, a welder should also be safe, ergonomic, robust, manufacturable, competitively priced and profitable. Additionally, the marketplace desires that the welder be continually upgraded for product enhancements, product market differentiation and frequent product refreshing. A large drawback in creating new and fresh product designs is the development time required to meet the design requirements with each and every design cycle. Development time for a single welder product can be one to two years and much longer for entire product lines. Accordingly, it is desirable to reduce the development time for a welder while meeting the design requirements.

SUMMARY OF THE INVENTION

A power module cartridge for a welder includes a chassis tray that is dimensioned to fit inside an external case of the welder. The chassis tray includes a fan receptacle, a capacitor receptacle, a rectifier mounting slot and a transformer receptacle. A fan fits into the fan receptacle; a capacitor fits into the capacitor receptacle; a rectifier plate fits into the rectifier mounting slot; and a transformer fits into the transformer receptacle. The chassis tray can also include a clip for receiving a printed circuit board ("PCB"). The PCB can be electrically connected to the aforementioned components. A second chassis tray can fit on the top of each of the components such that the components are sandwiched between the first and second chassis trays.

A method for manufacturing a welder includes providing a chassis tray having appropriately shaped component stations that include a fan receptacle, a capacitor receptacle, a rectifier mounting slot and a transformer receptacle. The method further includes fitting a fan into the fan receptacle, fitting a capacitor in the capacitor receptacle, fitting a rectifier plate into the rectifier mounting slot and fitting a transformer into the transformer receptacle. An upper chassis tray can be placed overtop the components to sandwich the components between the chassis trays. The chassis tray can be placed into a welder case either before the components are placed into the tray or after the components are placed into the tray. A printed circuit board can be fit onto the upper chassis tray and connections can be made between the components and the circuit board.

BRIEF DESCRIPTION OF THE DRAWINGS

FIGS. 2A and 2B are cross sectional views of the welder similar to FIG. 2 showing different transformers disposed in the power module cartridge and an adjustable retaining mechanism for the transformers.

FIG. 9 is a plan view of the second side of the chassis tray of FIG. 7.

FIG. 10 is a side elevation view of the chassis tray of FIG. 8.

FIG. 11 is a rear end view of the chassis tray of FIG. 8.

FIG. 12 is a front end view (opposite FIG. 11) of the chassis tray of FIG. 8 with portions broken away.

FIG. 13 is a plan view of the first side of the chassis tray of FIG. 7.

DETAILED DESCRIPTION

Figure 1:
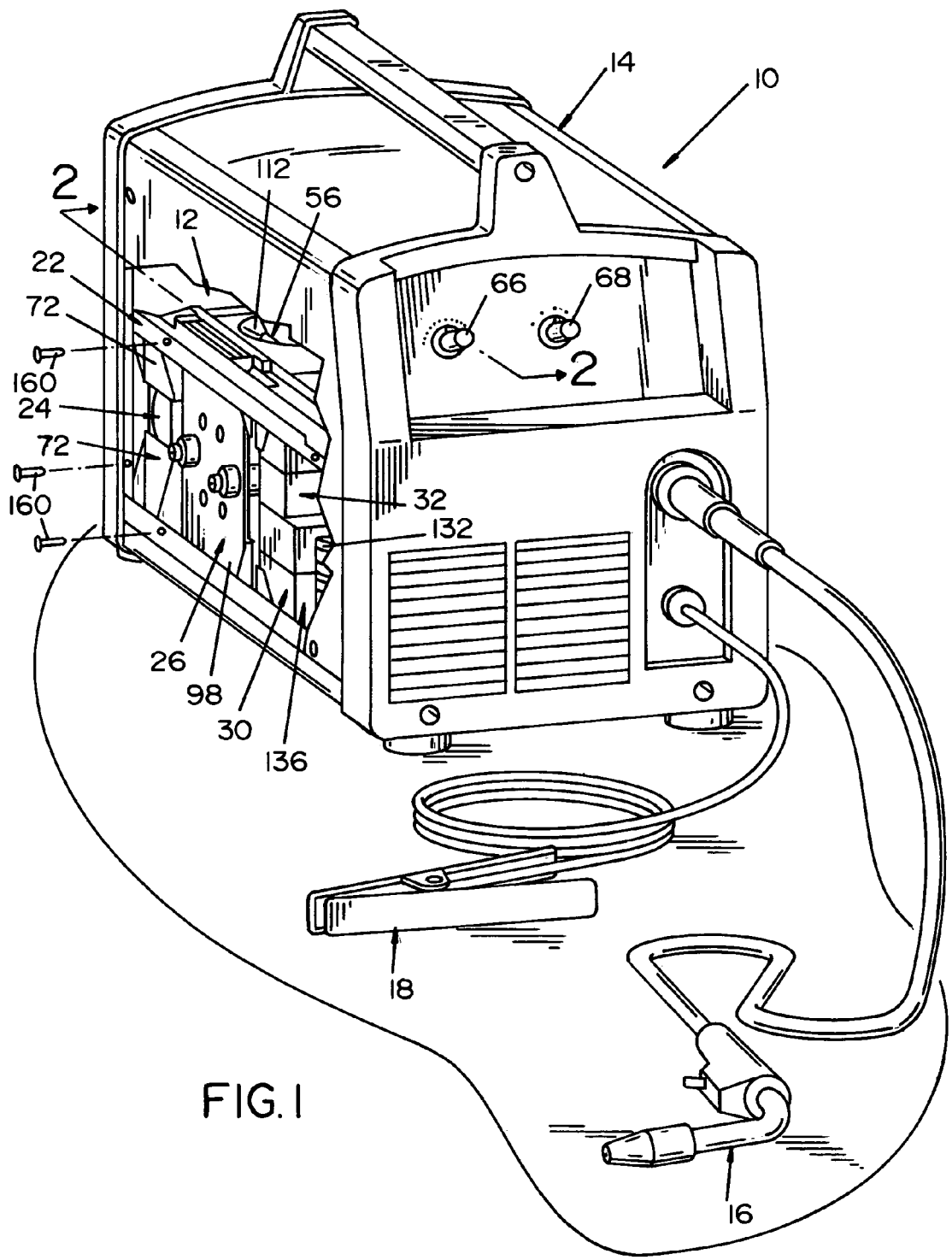
FIG. 1 is a front perspective view of a welder with portions of an external case of the welder broken away showing a power module cartridge disposed therein.

As seen in FIG. 1, a welder 10 includes a power module cartridge 12 housed in an external case 14. The welder 10 can include a wire feeder welder that typically includes a gun 16 and a ground clamp 18 that are known in the art and therefore require no further description. The case 14 can be made from a plurality of panels that are fastened together. Some of the panels can be easily removed to provide access to the power module cartridge 12 and other internal components. The power module cartridge 12 can also be used with other welders known in the art.

Figure 2:
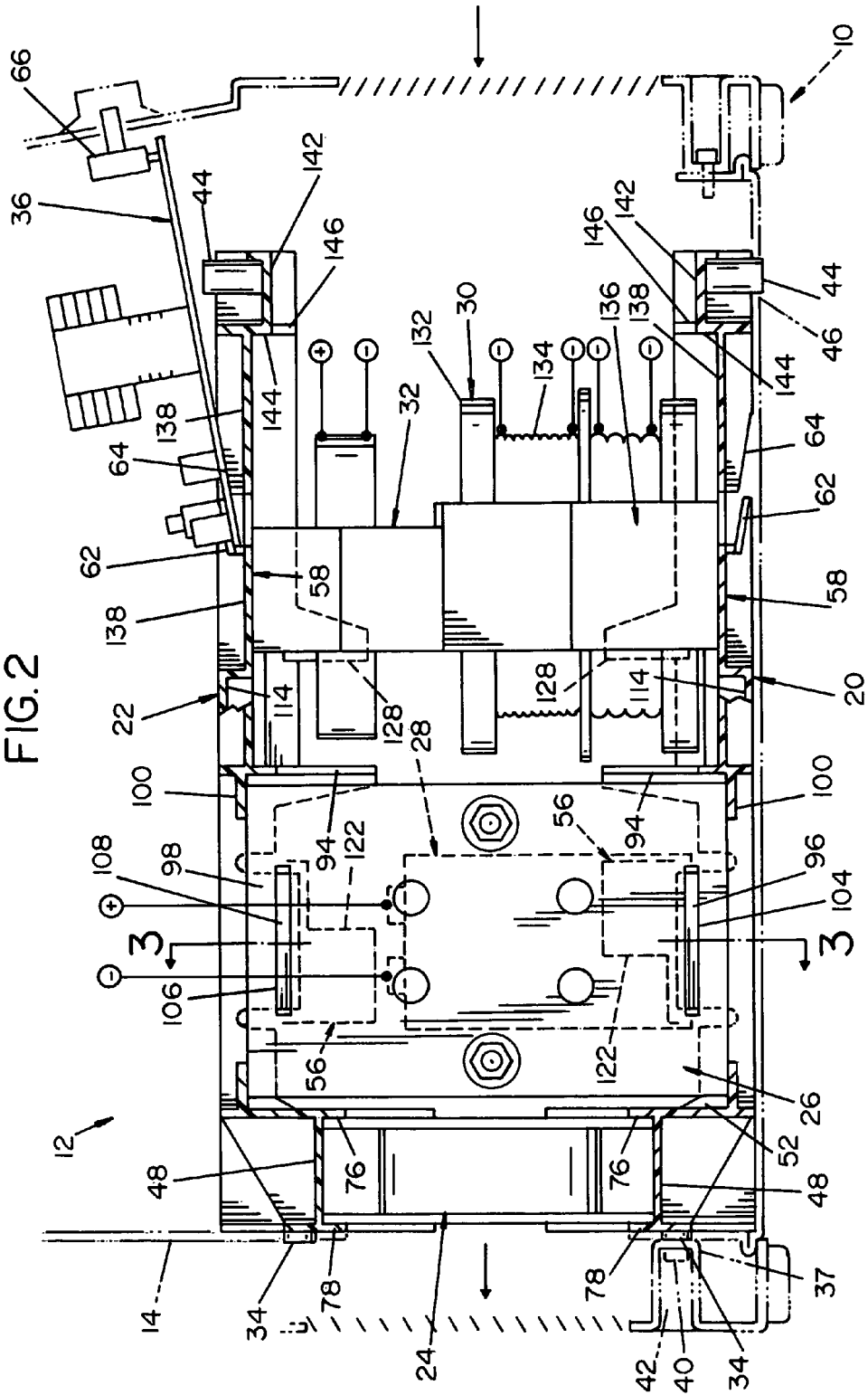
FIG. 2 is a cross sectional view of the welder taken along line 2-2 of FIG. 1 with the external case shown in phantom.

With reference to FIG. 2, the power module cartridge 12 includes a first or lower chassis tray 20 and a second or upper chassis tray 22 having a plurality of components sandwiched between the chassis trays. The upper and lower chassis trays receive a fan 24, a rectifier 26, a capacitor 28, a transformer 30 and a choke 32. In the embodiment depicted, a printed circuit board ("PCB") 36 mounts to the upper chassis tray 22 and the components are suitably wired to one another and the PCB so that the components cooperate with one another to produce an output for welding. The chassis trays 20 and 22 are appropriately shaped and dimensioned to be received inside the external case 14 of the welder 10. Also, for ease of making the chassis trays 20 and 22 and assembly of the welder 10, the chassis trays can be identical or substantially similar to one another. In the depicted embodiment, each chassis tray is made from a single piece of molded plastic; however the trays can be made from metal or other suitable material.

Figure 5:
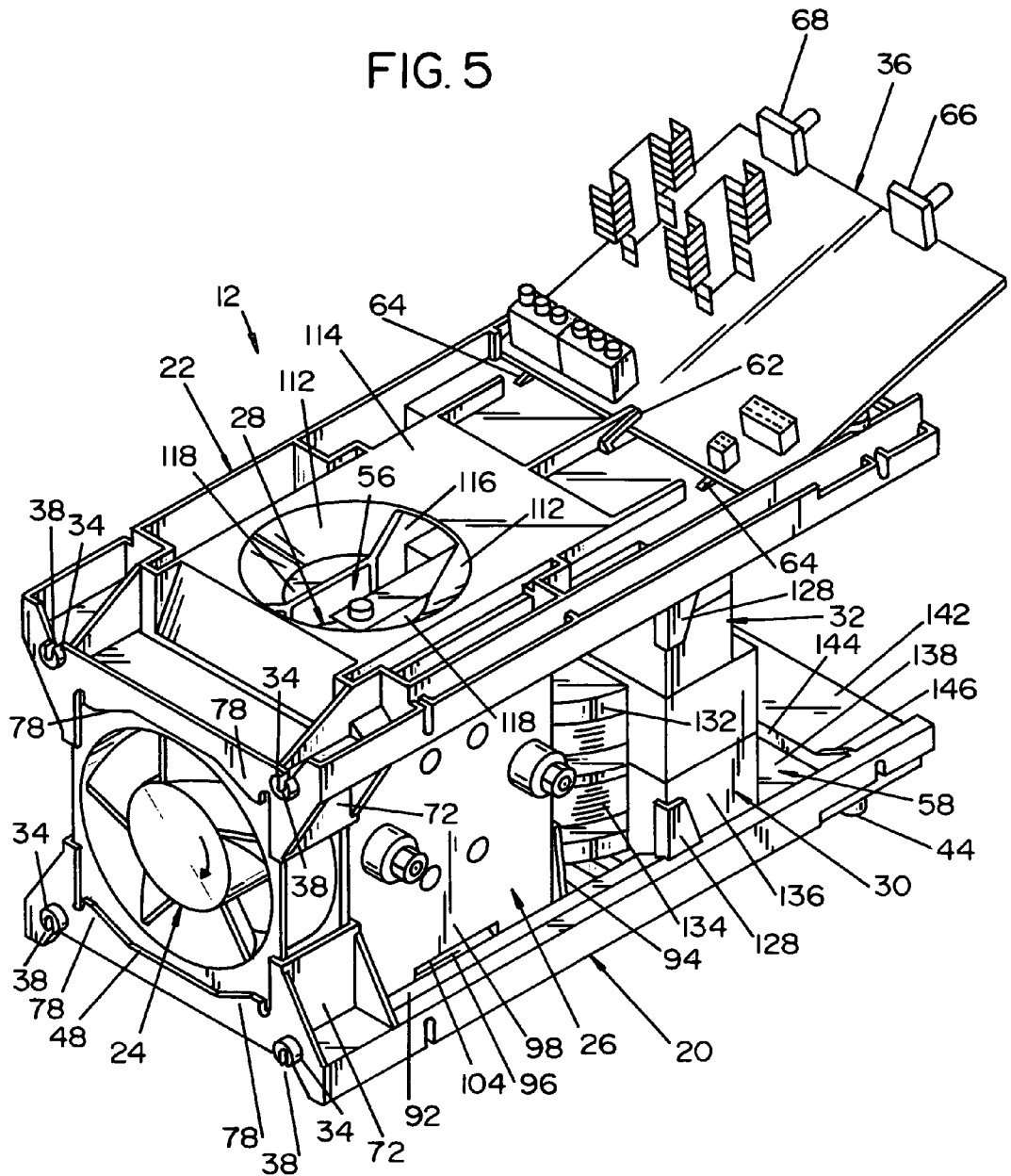
FIG. 5 is a rear perspective view of the power module cartridge of FIG. 4.

Each chassis tray includes locating features that facilitate proper placement of each chassis 20 or 22 inside the external case 14. Each chassis includes two buttons 34 (only one visible on each chassis in FIG. 2). The buttons 34 fit into correspondingly shaped receptacles 37 formed in the case 14. Each button 34 includes an opening 38 (FIG. 5) for receiving a fastener 40 to further secure the lower chassis tray 20 inside the external case. A recess 42 is formed in the case 14 to receive the fastener 40. An upper recess can be provided over the lower recess 42 even though one is not shown in FIG. 2. In addition to the two rear buttons 34 on each chassis tray, two other buttons 44 (only one visible in FIG. 2) are also provided on each chassis tray to facilitate location of at least the lower tray 20 inside the case 14. From the orientation depicted in FIG. 2, the additional buttons 44 are located on the lower side of the lower chassis tray 20 and are received in apertures 46 formed in the external case. To insert the lower chassis into the case, the rear portion of the lower chassis can be inserted first so that the buttons 34 fit into the receptacles 37. Then the lower buttons 44 fit into the receptacle 46 so that the lower chassis 20 is firmly fixed inside the case.

Figure 6:
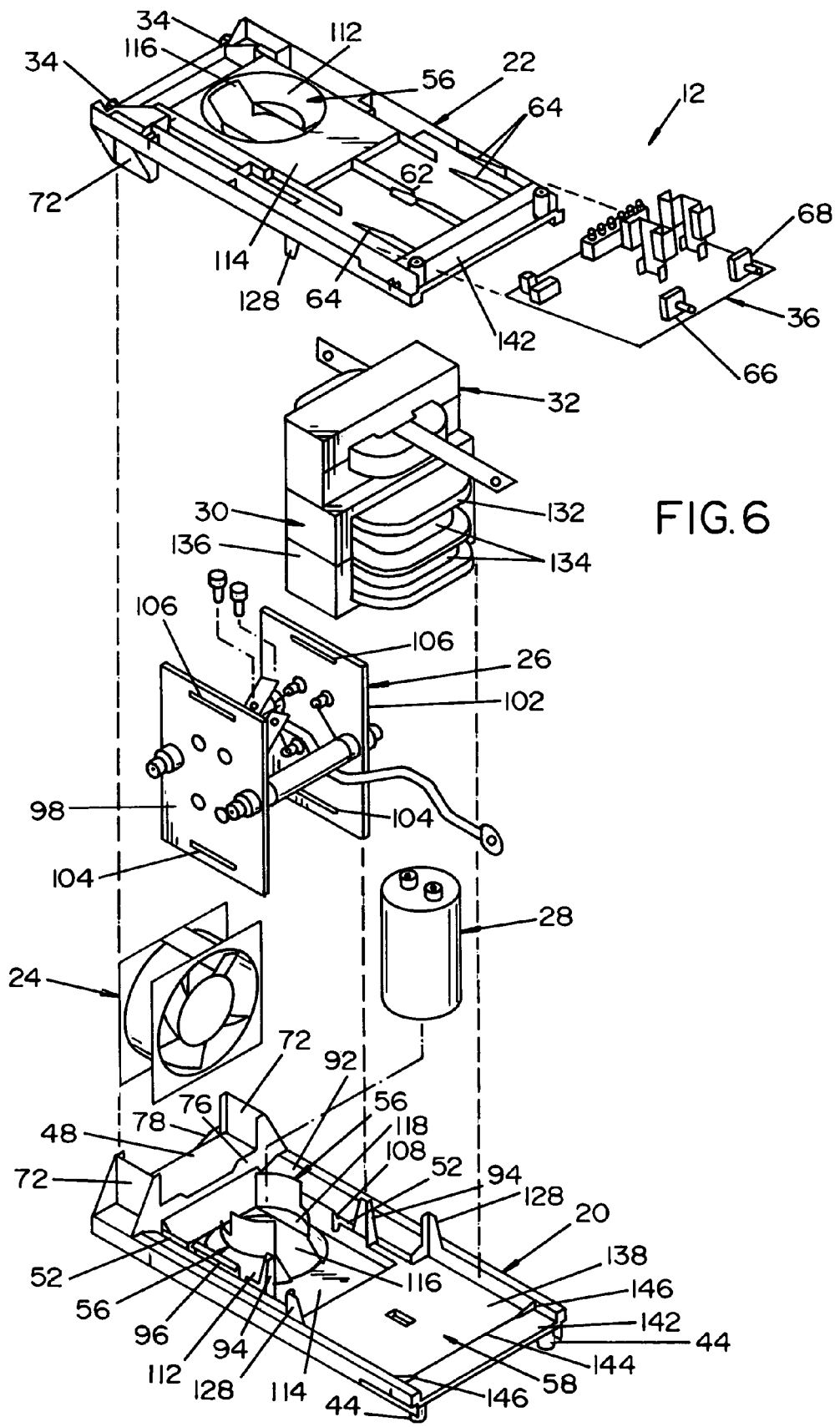
FIG. 6 is an exploded front perspective view of the power module cartridge of FIG. 4.

With reference to the embodiment depicted in FIG. 6, the chassis trays 20 and 22 are identical to one another; therefore, description of the one supports description of the other. As seen in FIG. 6, a first side (upper side) of the upper tray 22 is visible and a second side (lower side) is not. For the lower tray 20 the first side (lower side) is not visible but the second side (upper side) is visible. Reference to certain chassis trays in the description is simply made for ease of understanding the figures and the orientation or location of the trays in the figures and not to limit the invention to certain embodiments. With reference to FIG. 6, the lower chassis tray 20 includes a plurality of mounting stations or pockets that receive the aforementioned components of the power module cartridge. The lower chassis tray 20 includes a plurality of component mounting stations: a fan platform and receptacle 48, first and second rectifier plate mounting slots 52 and 54, a capacitor receptacle 56 and a transformer receptacle 58. The component mounting stations provide easy locating and placement of components for a quick assembly of the power module cartridge, and in turn the entire welder, while also decreasing the likelihood of assembly errors. The chassis trays also reduce part counts by eliminating support brackets that were once used to individually attach each component inside a welder compartment. Likewise, electrical connections are simplified.

Figure 7:
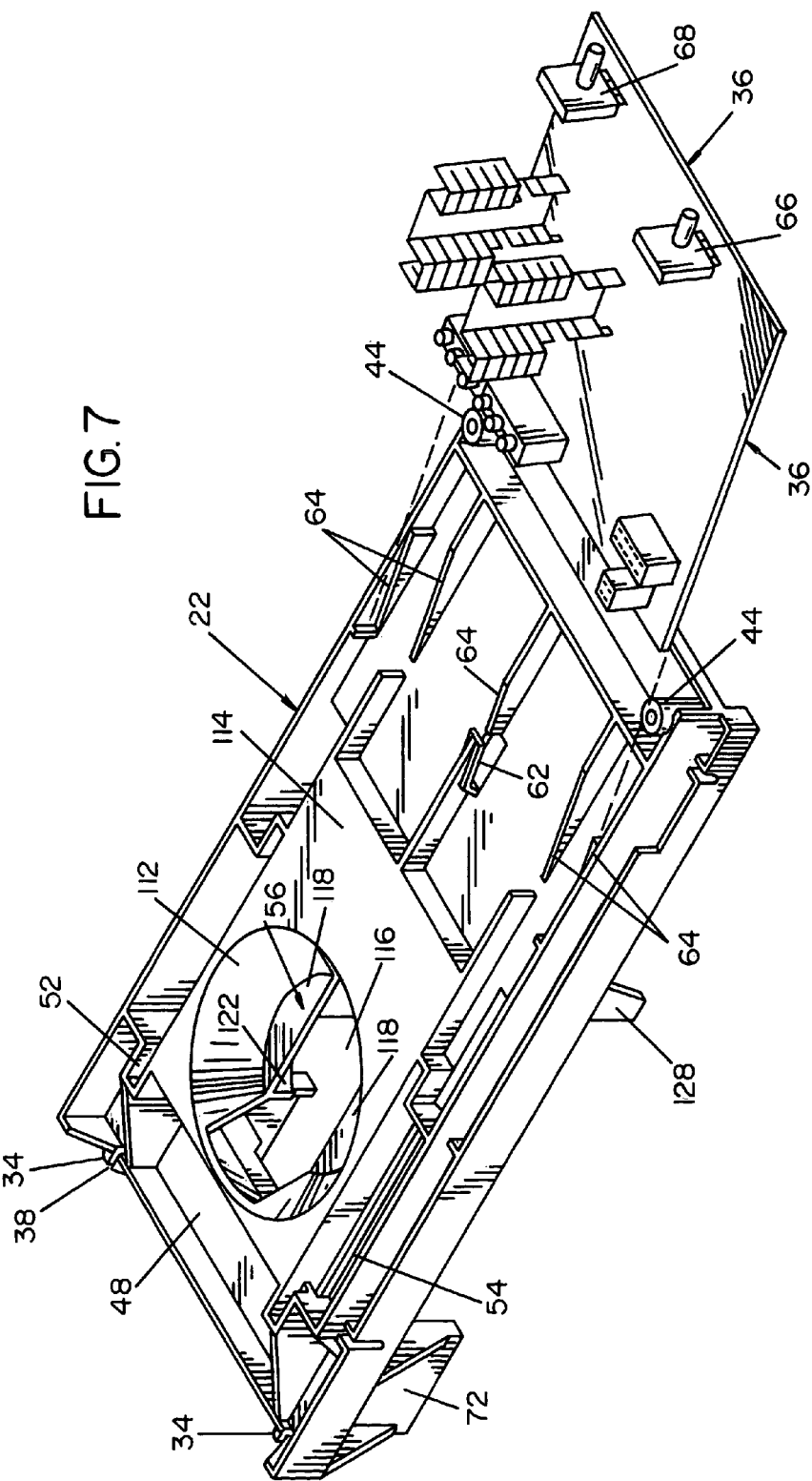
FIG. 7 is a front perspective view of a first side of a chassis tray of the power module cartridge of FIG. 4 with a printed circuit board exploded from the chassis tray.

In addition to including the aforementioned mounting stations and/or pockets, each chassis tray includes a clip 62 for receiving the PCB 36. With reference to FIG. 7, each chassis tray (the upper chassis tray 22 of FIG. 6 being shown in this figure) includes a plurality of PCB positioning ramps 64 that support the PCB 36. With reference back to FIG. 2, the ramps 64 support the PCB 36 in a slanted configuration so that the voltage and wire feed POTS 66, 68 align with a slanted front wall of the external casing 14 of the welder 10.

Figure 8:
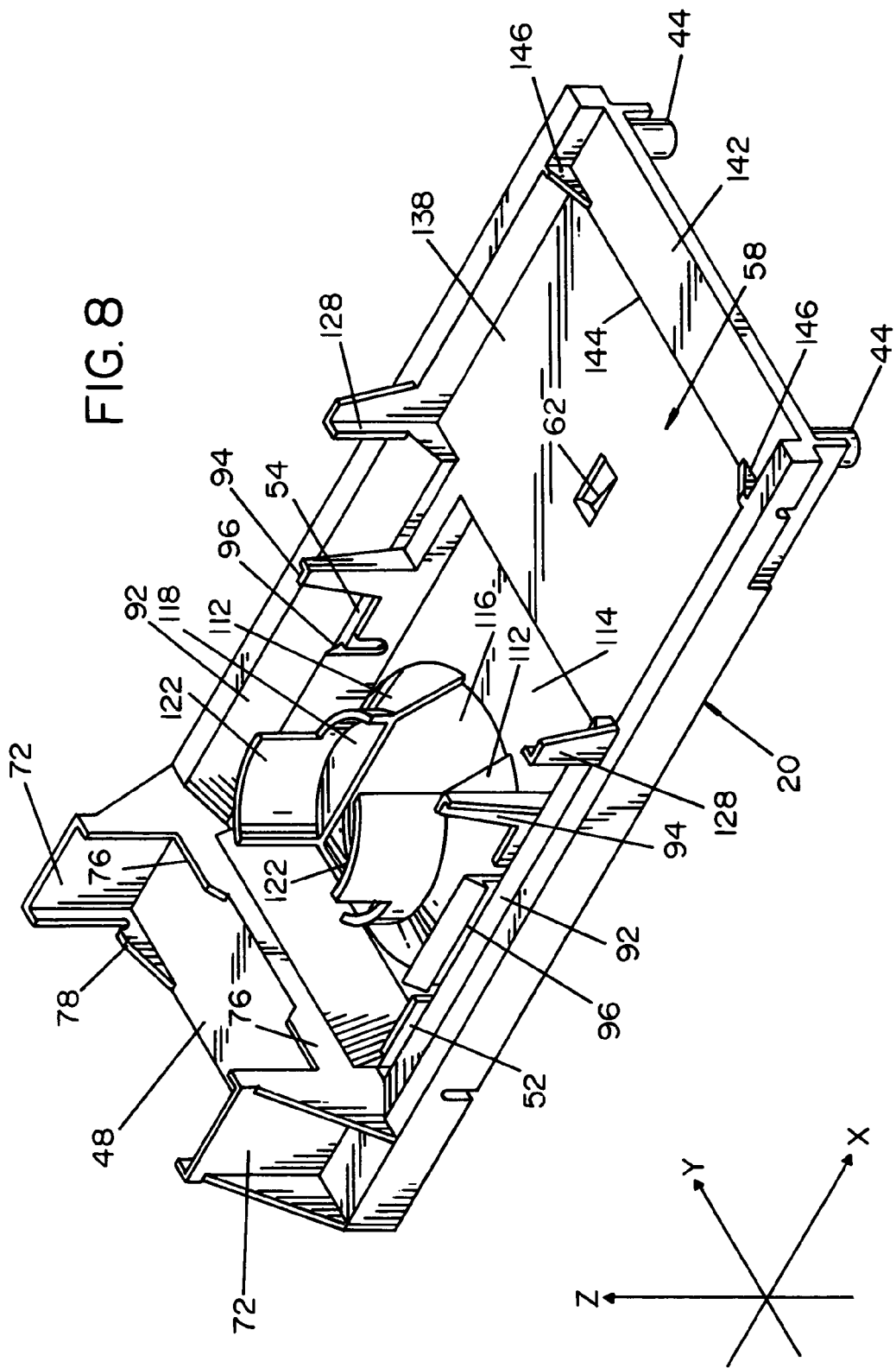
FIG. 8 is a perspective view of a second side of the chassis tray of FIG. 7.

The lower chassis tray 20 (as well as the upper chassis tray 22) are symmetrical along the x-axis, as shown in FIG. 8, which allows the upper chassis tray 22 to be identical to the lower chassis tray 20, if desired. Where FIG. 8 depicts the lower chassis tray 20 as shown in FIG. 6, the fan platform and receptacle 48 of the lower chassis tray 20 includes lateral side walls 72 that run parallel to the x-axis and are spaced from one another on opposite lateral sides of the chassis tray 20. Forward end walls 76 extend from each forward end of the lateral side walls 72, and a rearward end walls 78 extend from rearward ends of the lateral side walls 72. The end walls 78 and 76 are spaced from one another a distance that is approximately equal to the depth of the fan 24 and the lateral side walls 72 are spaced from one another approximately equal to the width of the fan 24. The forward and rearward end walls 76 and 78 are somewhat L-shaped where a lower end extends towards a central longitudinal (x-axis) axis of the lower chassis 20 and can abut and/or be integral with the lateral side walls 72. The lateral side walls 72 limit the movement of the fan in a direction parallel to the y-axis. The end walls 76 and 78 limit the movement of the fan 24 in a direction parallel to the x-axis. Also, the fan platform and receptacle 48 is spaced above the floor mounting receptacles and slots limiting the movement of the fan in a direction parallel to the Z axis. Even though a specific configuration for the fan mounting receptacle has been shown and described, the fan mounting receptacle can take other configurations, especially when a different size or shaped fan is used. Accordingly, the size and shape of the fan mounting receptacle can change to correspondingly receive a different shaped fan, however it is desirable that the fan mounting receptacle be appropriately dimensioned to limit the movement of the fan.

With continued reference to FIG. 8, the lower chassis tray 20 also includes the first rectifier plate slot 52 and the second rectifier plate slot 54. Since the chassis tray 20 is symmetrical along the x-axis, only one side of the tray and one rectifier slot will be described in detail with the understanding that the opposite side is a mirror image thereto. The first slot 52 is formed inward from the lateral edge of the chassis tray 20 and runs parallel to the x-axis. A chamfered edge 92 is formed adjacent and slopes towards the first rectifier slot 52 to facilitate easy location of a rectifier plate into the slot. The slot runs between the forward end wall 76 of the fan receptacle 48 to an upwardly extending generally L-shaped structure 94, which acts as a locator for rectifier plate. The rectifier locator 94 includes a first leg aligned with the length of the slot 52 and a second leg aligned with the width of the slot 52. A barb 96 is positioned adjacent the slot 52.

Figure 3:
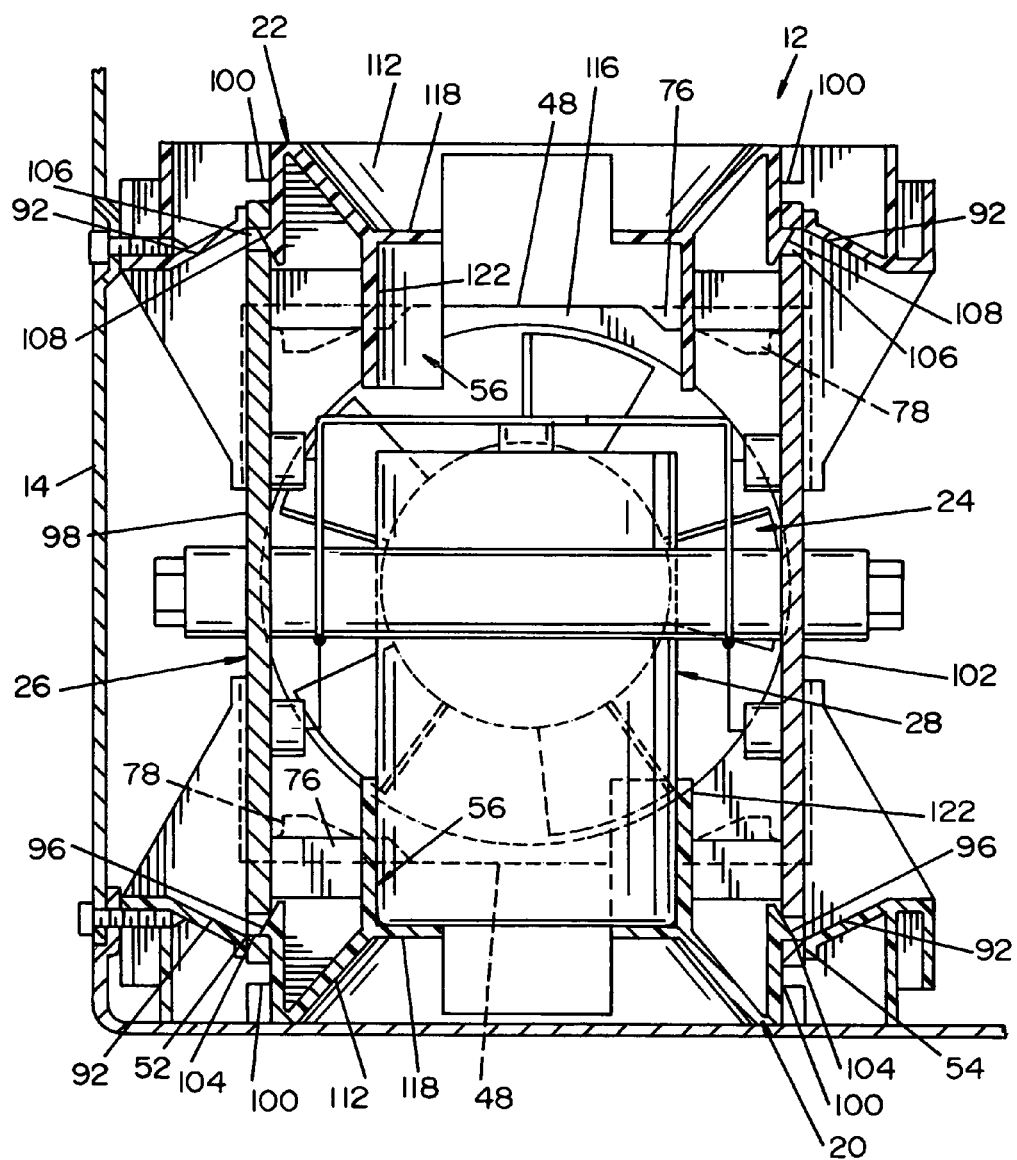
FIG. 3 is a cross sectional view of the welder taken along line 3-3 of FIG. 2.
Figure 4:
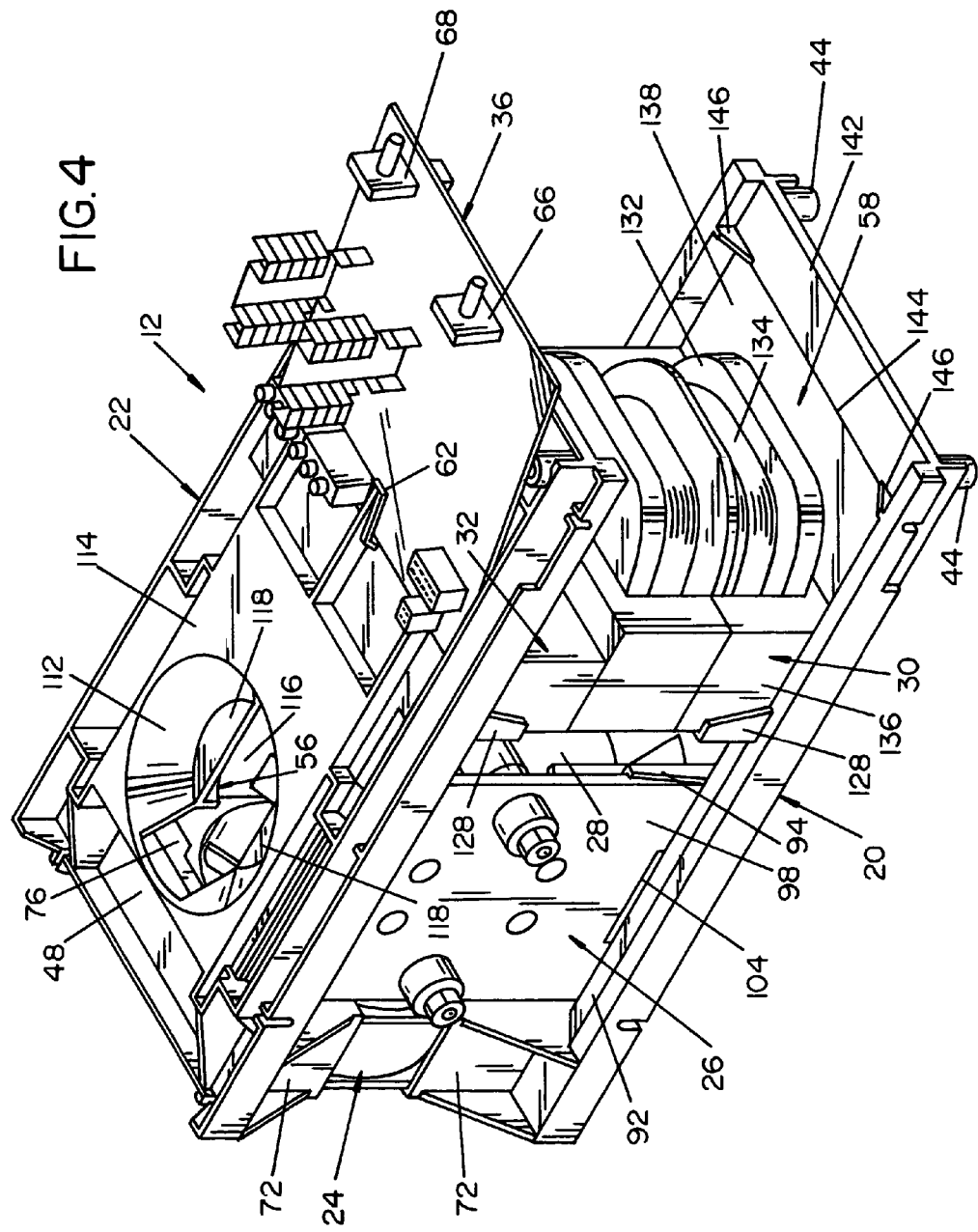
FIG. 4 is a front-perspective view of the power module cartridge of FIG. 1.

With reference to FIG. 6, the rectifier 26 includes a first plate 98 that is received inside the first rectifier slot 52 and a second plate 102 that is received inside the second rectifier slot 54. The rectifier and plates are of the type known in the art. Each rectifier plate includes an upper and lower slot that engages a respective barb. More particularly, a lower slot 104 in the first plate 98 engages and receives the barb 96. An upper slot 106 in the first plate 98 receives an upper barb 108 (FIG. 3) on the upper chassis tray 22 thereby locking the upper chassis tray 22 to the lower chassis tray 20. Instead of slots, the rectifier plates could have notches that receive the barbs. With further reference to FIG. 3, each chassis can include a web 100 to limit the movement of the rectifier plate as it is inserted into the slot 52. The opposite side of each chassis tray can lock with the second rectifier plate 102 in a similar manner to the first rectifier plate 98.

With reference back to FIG. 8, the capacitor receptacle 56 is disposed between the first rectifier plate slot 52 and the second rectifier plate slot 54 and between the fan receptacle 48 and the transformer receptacle 58. The capacitor receptacle 56 includes two axially truncated frustoconical supports 112 extending upwardly from a recessed floor 114. The frustoconical supports 112 are axially truncated such that an opening 116 is defined between the two supports 112. The opening 116 is centered along the central longitudinal axis, aligned with the x-axis, of the tray and provides access for the terminals of the capacitor, especially in the upper tray 22. A horizontal support or shelf 118 extends inwardly from each frustoconical support 112 towards the central longitudinal axis of the lower chassis tray 20. A truncated cylindrical wall 122 extends upwardly from each horizontal support 118. The truncated cylindrical walls 122 are appropriately shaped to snuggly receive the capacitor 28. The capacitor receptacle can take other configuration where the capacitor is differently shaped than that shown.

The transformer receptacle 58 is defined at a rearward end by two L-shaped structures 128 that act as locators and are disposed on opposite sides of the lower chassis tray 20. The locators 128 are spaced from the capacitor receptacle 56 and the rectifier mounting plate slots 52 and 54 along the x-axis to allow for clearance for the transformer bobbin 132 (FIG. 2) and transformer coils 134 when the transformer core 136 abuts the locators 128. In the embodiment depicted in the figures, the transformer receptacle 48 is defined by a transformer receptacle floor 138 that is lower than a rearmost lower surface 142 of the tray such that a rear retaining wall 144 (most clearly seen in FIG. 2) is formed. Also, lateral triangular walls 146 can be formed on opposite sides of the lower chassis tray 20 extending above the rear retaining wall 144.

With reference to FIGS. 2A and 2B, each chassis tray can be configured to snuggly receive transformers having different sized transformer cores. The chassis trays 20 and 22 can include stop apertures 150 formed in the transformer floor 138. The openings 150 can be dimensioned to receive stops 152 that retain the transformer core 136. By providing openings and stops, the chassis trays can still be made identical to one another, but the trays can be used with different sized transformers.

To manufacture a welder 10 that includes the power module cartridge 12, the lower chassis 20 can be placed inside the case of the welder 10 and the components can fit into their respective mounting stations, or the components can be fit into their respective mounting stations and then the entire cartridge can be placed into the case of the welder 10. Also, some components can be placed into the mounting station while outside the welder and then a partially constructed power module cartridge can be placed inside the case of the welder 10 and assembly of the welder can be completed. Openings can be provided in either the upper chassis tray 22 or the lower chassis tray 20 to provide for electrical connections between the components and the PCB 36. Also, notches and other retaining devices can be formed in the chassis trays while receiving wires that connect the components to one another. With reference back to FIG. 1, fasteners 160 can be provided to further attach the chassis trays to the external case 14. The chassis trays can provide a jig upon which components of the welder can be assembled.

As seen in FIG. 6, the choke 32 mounts on the transformer 36. When the upper chassis tray 22 is positioned on top of the components, the floor 138 of the transformer pocket 58 (see FIG. 2) can rest on the top of the choke 34.

Figure 14:
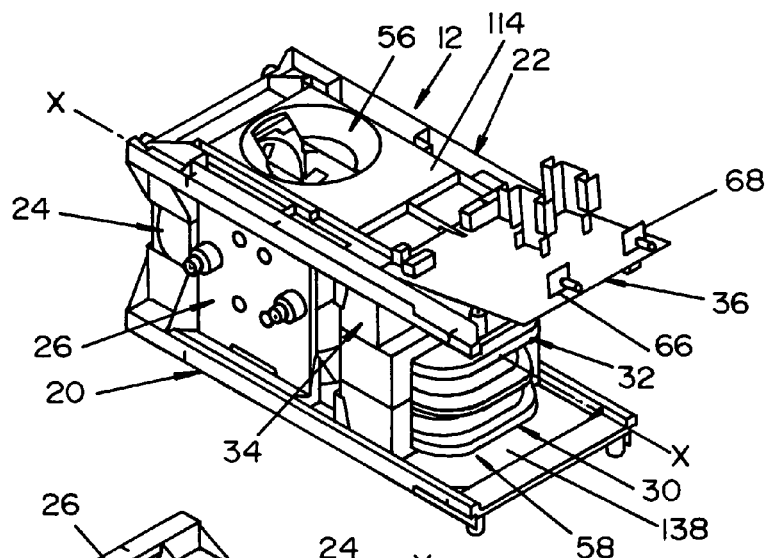
FIG. 14 is a perspective view of the power module cartridge aligned along an x-axis.
Figure 15:
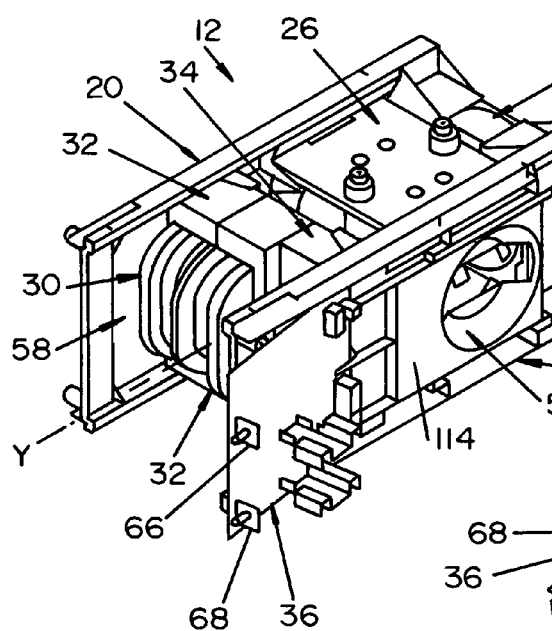
FIG. 15 is a perspective view of the power module cartridge aligned along a y-axis.
Figure 16:
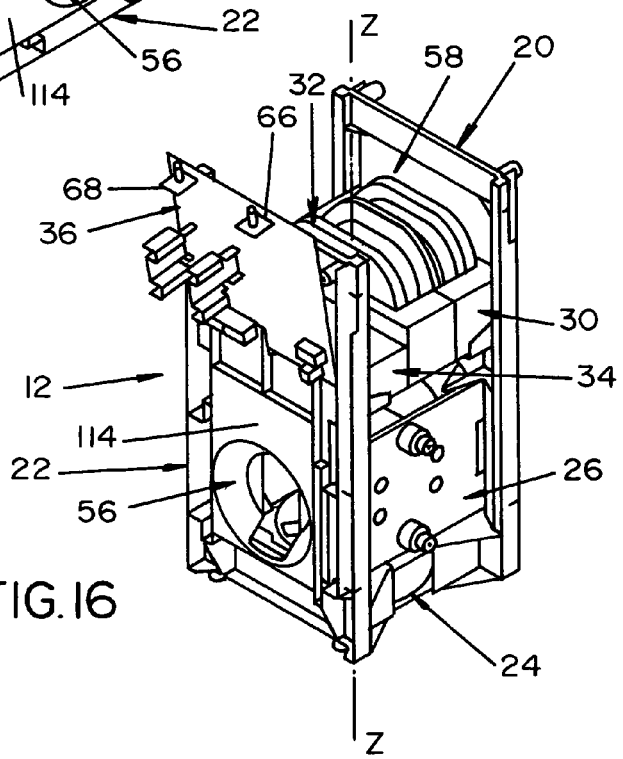
FIG. 16 is a perspective view of the power module cartridge aligned along a z-axis.

The power module cartridge 12 can be oriented in a number of different ways, as shown in FIGS. 14, 15 and 16. Accordingly, one power module cartridge can be provided for a vertically oriented welder (FIG. 16) as well as an alternative configuration for a horizontally situated welder (FIG. 15). In such configurations the upper chassis tray may simply be referred to as a first chassis tray and the lower chassis tray can be referred to as a second chassis tray. The chassis trays, as well as the rectifier plates, provide a wind tunnel effect which provides more efficient cooling for the power components allowing conductors, heat sinks and other heat producing power components to be reduced in size.

A welder and power module cartridge have been described with reference to certain embodiments. Modifications and alterations will occur to other upon reading and understanding the preceding detailed description. The detailed description in not meant to limit the invention to only those embodiments described. Instead, the invention is defined by the appended claims and the equivalents thereof.

The invention claimed is:

1. A power module cartridge for a welder comprising:
a lower chassis tray dimensioned to fit inside an external case of a welder, the lower chassis tray including a lower fan mounting receptacle, a lower capacitor mounting receptacle, a lower first rectifier mounting slot, and a lower transformer mounting receptacle;

an upper chassis tray dimensioned to fit inside said external case of said welder, the upper chassis tray including an upper fan mounting receptacle, an upper capacitor mounting receptacle, an upper first rectifier mounting slot, and an upper transformer mounting receptacle;

said lower and upper chassis trays being mirror images of each other, said lower chassis tray having an upwardly-facing floor and said upper chassis tray having a downwardly-facing ceiling;

a fan snugly received in the lower and upper fan mounting receptacle;

a capacitor snugly received in the lower and upper capacitor mounting receptacle;

a rectifier including a first plate received in the lower and upper first rectifier mounting slot;

a transformer received in the lower and upper transformer mounting receptacle; and adjustable inserts for retaining the transformer in said lower and upper chassis trays, and further wherein the lower and upper chassis trays further having openings formed in a floor and a ceiling of the transformer mounting receptacles and the inserts are received in the openings adapted to retain the transformer, and still further wherein an opposed side of said upwardly-facing floor of said lower chassis tray and an opposed side of said downwardly-facing ceiling of said upper chassis tray, each having a clip adapted for receipt of a circuit board;

said power module cartridge further including at least one circuit board for insertion into said clip on said opposed side of said downwardly-facing ceiling of said upper chassis tray.

2. The cartridge of claim 1, wherein
the lower chassis tray is a unitary plastic molded piece.

3. The cartridge of claim 2, further comprising
an upper chassis tray that is at least substantially identical in configuration to the lower chassis tray, the upper chassis tray receiving the fan, the capacitor, the rectifier and the transformer.

4. The cartridge of claim 1, wherein
the lower chassis tray includes first and second parallel walls that define at least a portion of the fan mounting receptacle, the walls being spaced from one another to receive the fan between them and inhibit movement of the fan in at least a first axis.

5. The cartridge of claim 4, wherein the lower chassis tray includes third and fourth parallel walls that define at least a portion of the fan mounting receptacle, the third and fourth walls being spaced from one another and at least substantially perpendicular to the first and second walls such that the third and fourth walls inhibit movement of the fan in at least a second axis that is perpendicular to the first axis.

6. The cartridge of claim 1, wherein
the fan mounting receptacle is located adjacent an end of the lower chassis tray.

7. The cartridge of claim 1, wherein
the lower chassis tray includes an upwardly extending support and a platform extending from the support to define at least a portion of the capacitor mounting receptacle, and the capacitor rests on the platform.

8. The cartridge of claim 7, further comprising
a curved wall extending upwardly from the platform shaped for conforming receipt of the capacitor.

9. The cartridge of claim 7, wherein
the support includes an opening for providing access to terminals of the capacitor.
10. The cartridge of claim 1, wherein
the lower chassis tray further includes a second rectifier mounting slot, the first rectifier mounting slot positioned adjacent and running parallel to a first longitudinal edge of the tray, the second rectifier mounting slot positioned adjacent and running parallel to a second longitudinal edge, which is spaced from the first longitudinal edge.
11. The cartridge of claim 10, wherein
the lower chassis tray includes a first upwardly extending rectifier plate locator adjacent an end of the first rectifier mounting slot.
12. The cartridge of claim 11, wherein
the rectifier plate locator is disposed adjacent an end of the first rectifier mounting slot opposite the fan mounting pocket.
13. The cartridge of claim 10, wherein
the lower chassis tray includes a first barb adjacent the first rectifier mounting slot, and the first rectifier plate includes a corresponding slot for receiving the first barb.
14. The cartridge of claim 10, wherein
the capacitor mounting receptacle is disposed between the first rectifier mounting slot and the second rectifier mounting slot.
15. The cartridge of claim 14, wherein
the capacitor mounting receptacle is disposed between the fan mounting receptacle and the transformer mounting receptacle.
16. The cartridge of claim 1, wherein
the lower chassis tray further comprises a chamfered edge running along and adjacent to the first rectifier mounting slot.
17. The cartridge of claim 1, wherein
the lower chassis tray includes two upwardly extending transformer positioning members positioned adjacent opposite longitudinal edges of the tray and shaped for conforming receipt of the transformer.
18. The cartridge of claim 17, wherein
the lower chassis tray includes an upwardly extending retaining wall defining a portion of the transformer receptacle, wherein the retaining wall is spaced from the transformer positioning members along a longitudinal axis of the tray.
19. The cartridge of claim 1 wherein
the upper chassis tray and the lower chassis tray are symmetrical with respect to a central axis.
20. The cartridge of claim 19, wherein
the upper tray includes a barb for engaging the rectifier and the lower tray also includes a barb for engaging the rectifier, and wherein the rectifier includes an upper notch or slot for receiving the barb of the upper tray and the rectifier includes a lower notch or slot for receiving the barb of the lower tray.
21. The cartridge of claim 1, wherein
the upper tray includes a plurality of ramps positioned on the same side of the tray as the clip, wherein the ramps support the circuit board when the circuit board is received by the clip.
22. The cartridge of claim 19, wherein
the upper chassis and the lower chassis are identical.
23. A pair of mirror-image chassis trays for positioning inside a power module cartridge for a welder, one tray juxtaposed on top of the other, each chassis tray comprising:
a fan mounting station dimensioned to accommodate a fan between said pair of trays,
a capacitor mounting station dimensioned to accommodate a capacitor between said pair of trays,
a first rectifier mounting station dimensioned to accommodate a rectifier between said pair of trays,
a transformer/choke combination mounting station having inserts for retaining the transformer/choke combination between said pair of trays, and
openings formed in each of the transformer/choke mounting stations, and wherein the inserts are received in the openings configured to retain the transformer/choke combination,
each of said trays having exterior-facing surfaces adapted to receive a printed circuit board by at least one clip on said exterior-facing surfaces.
24. The chassis trays of claim 23, wherein
each of the chassis trays is symmetrical with respect to a central longitudinal axis of the chassis tray.
25. The chassis trays of claim 23, wherein
each of the chassis tray is a single unitary piece of plastic.
26. The chassis trays of claim 23, further comprising
first and second upwardly extending parallel walls for each tray that define at least a portion of the fan mounting station, the walls being spaced from one another to receive a fan between them and inhibit movement of the fan in at least a first axis.
27. The chassis trays of claim 26, further comprising
third and fourth upwardly extending parallel walls for each try that define at least a portion of the fan mounting station, the third and fourth walls being spaced from one another and perpendicular to the first and second walls such that the third and fourth walls inhibit movement of the fan in at least a second axis that is perpendicular to the first axis.
28. The chassis trays of claim 23, further comprising
an upwardly extending support and a platform extending from the support for each tray, wherein the support and the platform define the capacitor mounting station.
29. The chassis trays of claim 28, further comprising
a curved wall for each tray extending upwardly from the platform and defining at least a portion of the capacitor mounting station.
30. The chassis trays of claim 29, wherein the support includes
an opening for each tray for providing access to terminals of a capacitor.
31. The chassis trays of claim 23, further comprising
a first barb adjacent the first rectifier mounting station for each tray.
32. The chassis trays of claim 23, further comprising
a plurality of ramps positioned on the side of each tray opposite the mounting stations.
33. The chassis trays of claim 23,
a locator defining at least a portion of the transformer/choke mounting station for each tray,
a first of the openings being spaced a first distance from the locator for receiving a transformer core of a first size and a second of the openings being spaced a second distance from the locator for receiving a transformer core of a second size.
34. A power module cartridge for a welder comprising:
a lower chassis tray dimensioned to fit inside an external case of a welder, the lower chassis tray including a fan mounting receptacle, a capacitor mounting receptacle, a first rectifier mounting slot, and a transformer mounting receptacle having openings formed in a floor of the transformer mounting receptacle;

a mirror-image upper chassis tray for use in combination with said lower chassis tray;
a fan snugly received in the fan mounting receptacle;
a capacitor snugly received in the capacitor mounting receptacle;
a rectifier including a first plate received in the first rectifier mounting slot;
a transformer received in the transformer mounting receptacle;
an insert received in at least one of the openings of the lower chassis tray for retaining the transformer; and
an exteriorly-facing side of said upper chassis tray comprises a clip adapted for receipt of a circuit board;
said power module cartridge further including at least one circuit board for insertion into said clip.

35. The chassis tray of claim 34,
a locator extending upwardly from the floor and defining at least a portion of the transformer mounting receptacle,
a first of the openings being spaced a first distance from the locator for receiving a transformer core of a first size and
a second of the openings being spaced a second distance from the locator for receiving a transformer core of a second size.

36. The cartridge of claim 34, wherein
the lower chassis tray further includes a second rectifier mounting slot,
the first rectifier mounting slot positioned adjacent and running parallel to a first longitudinal edge of the tray,
the second rectifier mounting slot positioned adjacent and running parallel to a second longitudinal edge, which is spaced from the first longitudinal edge.

37. The cartridge of claim 36, wherein
the lower chassis tray includes a first upwardly extending rectifier plate locator adjacent an end of the first rectifier mounting slot.

38. The cartridge of claim 37, wherein
the rectifier plate locator is disposed adjacent an end of the first rectifier mounting slot opposite the fan mounting pocket.

39. The cartridge of claim 36, wherein
the lower chassis tray includes a first barb adjacent the first rectifier mounting slot, and the first rectifier plate includes a corresponding slot for receiving the first barb.

* * * * *